Nov. 7, 1950　　　　　J. E. FORSLUND　　　　2,528,588
HYDRAULIC CRANE FOR MOTOR VEHICLES

Filed June 1, 1949　　　　　　　　　　　　2 Sheets-Sheet 1

INVENTOR.
Johan Elis Forslund
BY Robert E. Burns
ATTORNEY

Nov. 7, 1950 J. E. FORSLUND 2,528,588
HYDRAULIC CRANE FOR MOTOR VEHICLES
Filed June 1, 1949 2 Sheets-Sheet 2

INVENTOR.
Johan Elis Forslund
BY
ATTORNEY

Patented Nov. 7, 1950

2,528,588

UNITED STATES PATENT OFFICE 2,528,588

HYDRAULIC CRANE FOR MOTOR VEHICLES

Johan Elis Forslund, Skelleftea, Sweden, assignor to Fabriks A. B. Forslund & Co., Skelleftea, Sweden, a corporation of Sweden Application June 1, 1949, Serial No. 96,498, In Sweden June 18, 1948

2 Claims. (Cl. 212—35)

This invention relates to hydraulic cranes for motor vehicles, and particularly for motor lorries and motor trucks.

One object of the invention is to provide a crane which takes up a small space and does not essentially reduce the loading capacity of the vehicle on which the crane is mounted.

Another object is to provide a hydraulic crane of a simple and stable construction in which the hydraulic cylinder may be mounted vertically.

A further object is to provide a hydraulic crane having a load carrying cantilever arm which may be swung automatically both in a vertical and a horizontal plane.

These objects or other advantages I obtain by constructing my improved hydraulic crane in the manner hereinafter briefly described with reference to the accompanying drawings.

Figure 1:
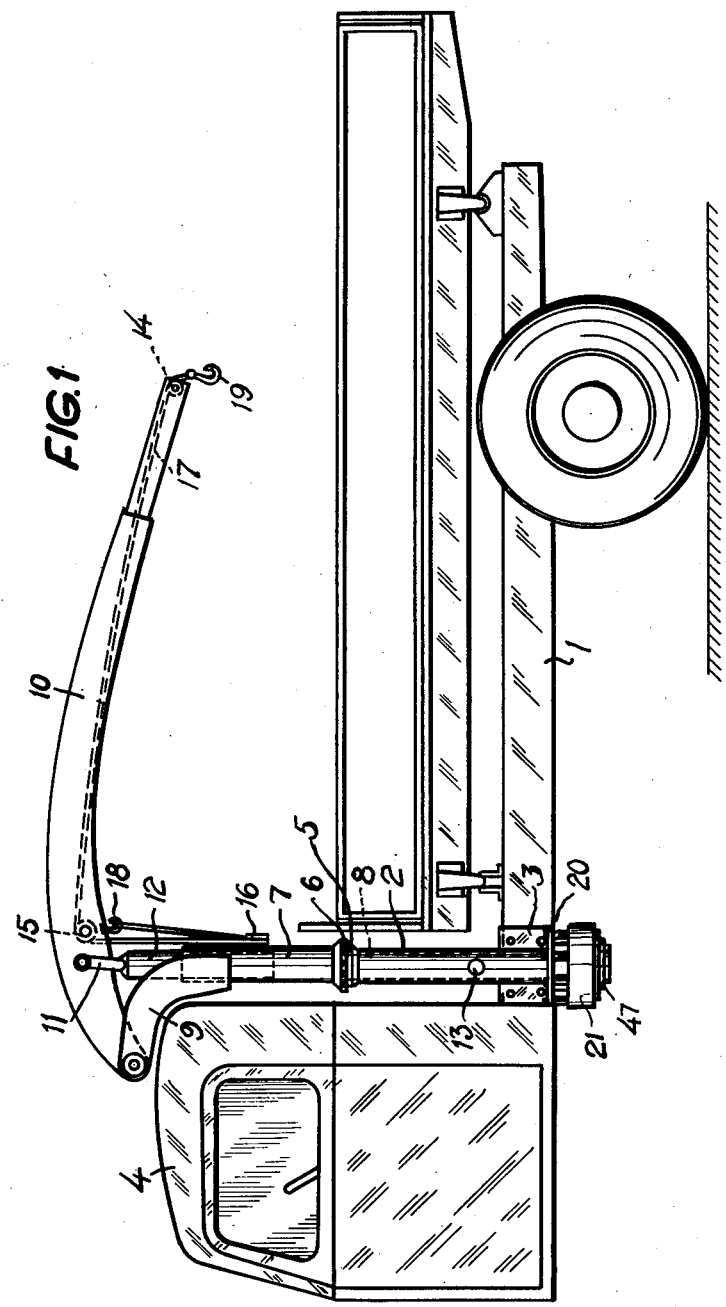
Fig. 1 is a side elevation of the crane mounted on a motor lorry the front portion of which is omitted.

Referring to the drawing, 1 designates the frame of a motor lorry, to which a tubular pedestal 2 is fixed in vertical position by means of a plate 3 immediately behind the driver's cab 4. Said pedestal is provided with a collar 5 on which is turnably resting a corresponding collar 6 of a hydraulic cylinder 7 of which an extension 8 extends through the pedestal 2. To the upper portion of the cylinder 7 there is welded a bracket 9 the form of which is so chosen as to correspond to the profile of the driver's cab and which, when it extends forwardly, the free end is located above the roof of said cab 4, as is shown. A cantilever arm 10 is hinged to the free end of said bracket 9 for up and down movement in a vertical plane. For the movement of the cantilever arm 10 up and down the latter is actuated by a link 11 pivotally secured to said arm 10 and to the upper end of a piston 12 which is movable in the cylinder 7. A pressure fluid, such as oil or water, is in the usual manner introduced into and discharged from the lower end of the cylinder by means of a conduit (not shown) connected to a control valve 13 mounted on the pedestal 1. The valve is supplied with a pressure fluid by means of another conduit (not shown) which is connected to a pressure pump (not shown) mounted on the vehicle.

The cantilever arm 10 is preferably composed of two plates which are secured in parallel relationship or the arm is tubular or U-shaped in section so that there will be an inner space in which at the outer end of the arm there is rotatably mounted a pulley or sheave 14 and adjacent to the link 11 another pulley 15. A similar pulley 16 is also mounted on the cylinder 7. The purpose of these pulleys is to act as guiding and supporting means for a hoist cable 17. The inner end of the hoist cable 17 is secured to a hook 18 fixed to the cantilever arm 10. From the hook 18 the hoist cable 17 extends downwardly to the pulley 16 from which it returns upwardly to the pulley 15 and therefrom in the space of the cantilever arm 10 and over the pulley 14. The outer and free end of the hoist cable 17 carries a swivel hook 19 or similar means for attachment to the load to be lifted. When the cantilever arm 10 is moved up or down the hook 19 will move up or down more rapidly than the end of the cantilever arm 10, with the result that the necessary movement of the cantilever arm 10 in loading and unloading is reduced.

Figure 2:
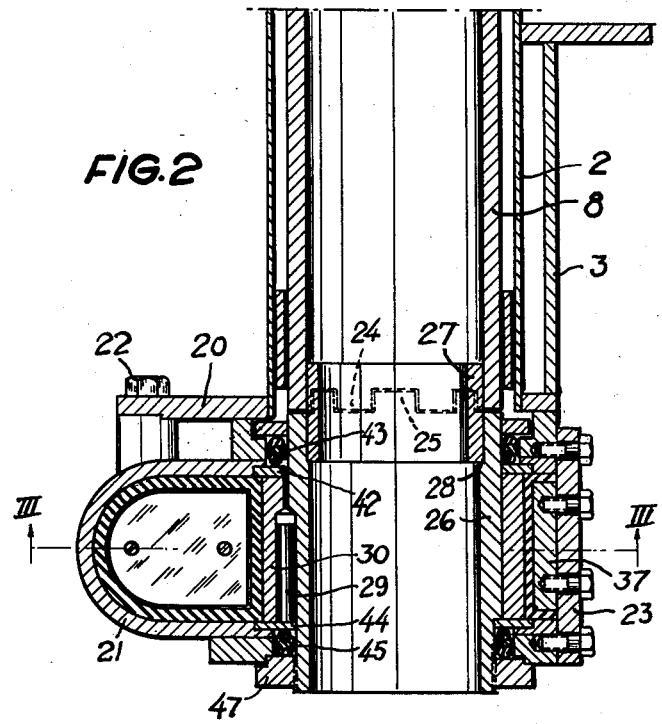
Fig. 2 is a vertical section of the means for swinging the load carrying arm of the crane in a horizontal plane.
Figure 3:
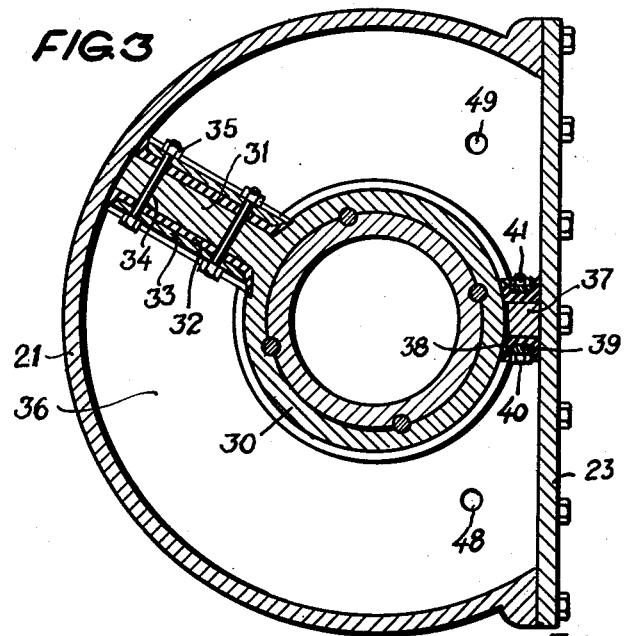
Fig. 3 is a section on line III—III in Fig. 2.

The means for turning the cylinder 7 about its axis is shown in Figs. 2 and 3. To the mounting plate 3 there is welded a horizontal plate 20 welded to the pedestal 2. A house 21 is supported by said plate 20 by means of bolts 22. In a horizontal section the chamber within said house has the form of a segment of a circle, as is shown in Fig. 3, and the rear side of said house is closed by means of a cover 23 bolted to said house. The lower end of the extension 8 is formed with teeth 24 which are in engagement with corresponding teeth 25 on the upper end of a continuation part 26 of the extension 8. A guiding ring 27 resting on an inner shoulder 28 of the continuation part 26 extends into the extension cylinder 8. Said continuation part 26 extends through openings in the upper and lower wall of the house 21, and to the portion thereof located within said house there is secured by means of four locking pins 29, a ring 30 having a radial projection 31 to the sides of which packings 32 are secured by means of washers 33 and bolts 34 with nuts 35. Said projection 31 forms a partition in the arched chamber 36 formed in the house 21 around the ring 30 and its packings 32 tighten closely against the upper, lower and arched peripheral walls of the house 21. Another partition 37 is bolted to the cover 23 and tightens against the ring 30 by means of packings 38 which are secured to said partition by means of washers 39 and bolts 40 with nuts 41. At the entrance of the continuation part 26 into the house 21 there is arranged a packing by means of a brazen ring 42 and rings 43 of rubber and, similarly, a brazen ring 44 and packing rings 45 of rubber are arranged at the outer end of the continuation part 26 where the latter leaves the house 21, and said packing rings 45 are held by means of a nut 47 threaded onto the end of the continuation part 26. It is obvious that the connection between the extension 8 and the continuation part 26 permits no axial forces to be transmitted from the extension 8 to the continuation part 26 or inversely.

The upper wall of the house 21 is provided with apertures 48 and 49 to which conduits (not shown) are to be connected. Through said conduits a pressure fluid, such as oil or water, is introduced into and discharged from the compartments of the chamber 36 lying on either side of the partition 31. By altering the pressure of the fluid in said compartments on both sides of the partition 31 the latter can be displaced in the chamber 36 and thus the ring 30 and the continuation part 26 are turned. As the part 26 is connected with the extension 8 by means of the teeth 24 and 25 said extension 8 is also turned. Thus, in this manner the hydraulic cylinder 7 is turned and the cantilever arm 10 may be swung from one side to the other of the motor vehicle on which the crane is mounted.

Of course it is possible to construct the device for turning the cylinder 7 about its axis in other ways, for example, as a toothed wheel gearing.

From the foregoing, it is believed that the construction, operation and advantages of the invention may be readily understood, and I am aware that changes may be made in the details disclosed without departing from the spirit of the invention, as expressed in the following claims.

What I claim is:

1. A hydraulic crane for motor vehicles, comprising a tubular pedestal, a hydraulic cylinder supported by said pedestal to turn about its axis, an extension of said cylinder extending through said pedestal, means connected with the end of said extension below said pedestal for turning said extension and, thus, said cylinder, a bracket firmly secured to said cylinder, a cantilever arm for carrying a load hinged to said bracket for up and down movement in a vertical plane, a piston in said cylinder, and a link pivotally connected with said piston and extending upwardly from said cylinder, the upper end of said link being pivotally connected to said cantilever arm.

2. A hydraulic crane for motor vehicles, comprising a mounting base, a tubular pedestal secured to said base, a hydraulic cylinder supported by said pedestal to turn about its axis, an extension of said cylinder extending through said pedestal, an arched pressure chamber secured to said base, a partition in said chamber connected with said extension and arranged to move in said chamber according to the pressure on its sides, means for supplying and discharging pressure fluid to and from, respectively, said chamber on both sides of said partition, a bracket firmly secured to said cylinder, a cantilever arm for carrying a load hinged to said bracket for up and down movement in a vertical plane, a piston in said cylinder, and a link pivotally connected with said piston and extending upwardly from said cylinder, the upper end of said link being pivotally connected to said cantilever arm.

JOHAN ELIS FORSLUND.

REFERENCES CITED

The following references are of record in the file of this patent:

UNITED STATES PATENTS

| Number | Name | Date |
| --- | --- | --- |
| 420,942 | Kilgore | Feb. 11, 1890 |
| 2,446,586 | Harbaugh | Aug. 10, 1948 |
| 2,462,926 | Wilson et al. | Mar. 1, 1949 |